UNITED STATES PATENT OFFICE.

OTTO HOFFMANN, OF CHARLOTTENBURG, GERMANY.

MANUFACTURE OF A NEW MATERIAL SUITABLE FOR USE IN DENTISTRY.

No. 870,962.  Specification of Letters Patent.  Patented Nov. 12, 1907.

Application filed May 20, 1905. Serial No. 261,461.

*To all whom it may concern:*

Be it known that I, OTTO HOFFMANN, chemist, a subject of the German Emperor, residing at Charlottenburg, Prussia, Germany, have invented the Manufacture of a New Material Suitable for Use in Dentistry, of which the following is a specification.

The plastic mineral matter or cement made of zinc oxid and phosphoric acid and commonly used in dentistry, has the effect, that it is not quite insoluble in the acids of the mouth and are consequently subject to gradual solution by the same. Moreover the said matter is quite opaque and has therefore a dull or dead appearance forming an unfavorable contrast to the natural teeth.
The present invention has for its object to produce a cementitious matter or paste perfectly free from the said defects, a material which is quite insoluble in organic acids, and owing to its translucence cannot be distinguished in appearance from the enamel of natural teeth, provided that the correct tint has been given to it. For this purpose basic or neutral phosphate, pyro-phosphate or borate of aluminium, which substances are known not to dissolve in organic acids, is stirred together with a solution of ortho-meta- or pyro-phosphoric acid in suitable proportions, thereby forming a paste, which after some time hardens to a translucent and stone-hard mass or cement. The result is not altered materially by mixing with the phosphate to be employed, (which may be dried at ordinary temperature or at a red heat) alumina-hydrate, or by dissolving varying quantities of alumina hydrate or zinc oxid or magnesia or mixtures of these bodies in the phosphoric acid solution before the latter is mixed with the phosphate or borate.
The tooth paste or plastic mineral matter obtained by the process described offers very great resistance to the acids of the mouth and to other chemical influences; it has at first the shape of a paste which owing to its high percentage of alumina, hardens on drying to a translucent mass, which when tinted in a suitable manner, does not differ in appearance from the natural enamel of teeth.

The following example serves to explain the details of procedure: 13 grams of alumina hydrate are dissolved in 81 grams of phosphoric acid having a specific gravity of 1.700 while adding water, the solution is filtered and boiled down to 110 grams. On the other hand neutral aluminium-ortho-phosphate is heated to bright red heat, then allowed to cool, pulverized and then stirred with the above mentioned solution to form a plastic mass. About 30 per cent of alumina hydrate heated at about 100° C. may be mixed with the pulverized phosphate before adding the latter to the alumina hydrate. A similar result may be obtained by dehydrating basic aluminium phosphate ($[2Al_2O_3] \cdot P_2O_5$) by heating to red heat, then pulverizing it and kneading it together with the liquid containing phosphoric acid (which has been prepared as described), so as to form a plastic mass.

What I claim is:—

The process for obtaining a new material suitable for use in dentistry, which consists in stirring aluminium phosphate together with a phosphoric acid solution containing alumina hydrate, to form a plastic mass, substantially as described.

In testimony whereof I have set my hand in presence of two subscribing witnesses.

OTTO HOFFMANN.

Witnesses:
EMIL BRODERICK,
GUSTAV ADLER.